United States Patent
Lin (10) Patent No.: US 7,035,934 B1
(45) Date of Patent: Apr. 25, 2006

(54) SYSTEM AND METHOD FOR IMPROVING TRAFFIC ANALYSIS AND NETWORK MODELING

(75) Inventor: Eddie Huey Chiun Lin, Winchester, MA (US)

(73) Assignees: Verizon Corporate Services Group Inc., New York, NY (US); BBNT Solutions LLC, Cambridge, MA (US); Level 3 Communications, Inc., Broomfield, CO (US)

( * ) Notice: Subject to any disclaimer, the term of this patent is extended or adjusted under 35 U.S.C. 154(b) by 0 days.

(21) Appl. No.: 09/533,148

(22) Filed: Mar. 23, 2000

(51) Int. Cl.
*G06F 15/173* (2006.01)
*H04L 12/56* (2006.01)

(52) U.S. Cl. ............... 709/238; 709/239; 709/245; 370/395.31

(58) Field of Classification Search ........ 709/238–245, 709/218, 249; 370/252, 254, 392, 356, 395.3–395.32, 370/252.1
See application file for complete search history.

(56) References Cited

U.S. PATENT DOCUMENTS

| | | | |
|---|---|---|---|
| 5,854,899 A | 12/1998 | Callon et al. | |
| 5,991,806 A * | 11/1999 | McHann, Jr. | 709/224 |
| 6,055,561 A * | 4/2000 | Feldman et al. | 709/200 |
| 6,249,820 B1 * | 6/2001 | Dobbins et al. | 709/238 |
| 6,262,976 B1 * | 7/2001 | McNamara | 370/254 |
| 6,266,700 B1 * | 7/2001 | Baker et al. | 709/230 |
| 6,321,271 B1 * | 11/2001 | Kodialam et al. | 709/244 |
| 6,377,987 B1 * | 4/2002 | Kracht | 709/220 |
| 6,392,997 B1 * | 5/2002 | Chen | 370/252 |
| 6,393,486 B1 * | 5/2002 | Pelavin et al. | 709/238 |
| 6,408,001 B1 * | 6/2002 | Chuah et al. | 370/392 |
| 6,418,476 B1 * | 7/2002 | Luciani | 709/238 |
| 6,473,421 B1 * | 10/2002 | Tappan | 370/351 |
| 6,553,002 B1 * | 4/2003 | Bremer et al. | 370/254 |
| 6,584,093 B1 * | 6/2003 | Salama et al. | 370/351 |
| 2002/0021675 A1 * | 2/2002 | Feldmann | 370/254 |

OTHER PUBLICATIONS

"NetFlow Services and Applications," CISCO Systems, Inc., Mar. 1999, pp. 1-27.
"NetFlow Switching Overview," CISCO Systems, Inc., http://www.cisco.com/univercd/cc/td/doc/product/software/ios120/12cgcr/switch_c/xcprt3/xcovntfl.htm, Printed Oct. 27, 1999, pp. XC35-38.

(Continued)

*Primary Examiner*—Dung C. Dinh
*Assistant Examiner*—Yasin Barqadle
(74) *Attorney, Agent, or Firm*—Leonard C. Suchyta, Esq.; Joel Wall, Esq.; Finnegan, Henderson, Farabow, Garrett & Dunner LLP (57) ABSTRACT

A system (800) improves a network designer's ability to analyze a data network having several routers. The system (800) accesses static routing information and/or open shortest path first route summarization information, determines an identity of a network prefix using the accessed information, and analyzes the data network using the determined identity. The network designer can use this determined identity for traffic analysis or modeling of the data network.

22 Claims, 8 Drawing Sheets

OTHER PUBLICATIONS

"Configuring NetFlow Switching," CISCO Systems, Inc., http://www.cisco.com/univercd/cc/td/doc/product/software/ios113ed/113ed_cr/switch_c/xcnetflo.htm, Printed Oct. 27, 1999, pp. XC-21-28.

"NetFlow Aggregation," CISCO Systems, Inc., http://www.cisco.com/univercd/cc/td/doc/product/software/ios120/120newft/120t/120t3/netflow.htm, Printed Oct. 27, 1999, pp. 1-24.

* cited by examiner

SYSTEM AND METHOD FOR IMPROVING TRAFFIC ANALYSIS AND NETWORK MODELING

FIELD OF THE INVENTION

The present invention relates generally to networks and, more particularly, to a system and method for improving analysis and modeling of a data network.

BACKGROUND OF THE INVENTION

Cisco's Netflow software provides the capability to collect the source and destination network prefixes of the traffic flows that pass through routers in the network. However, knowing the source and destination network prefixes of the traffic flows in a data network is typically insufficient for traffic analysis and network modeling purposes.

To adequately analyze and model traffic traversing a data network, it is important to be able to determine the autonomous system (AS) path from the source network to the destination network, and the entry and exit routers within a data network. When autonomous systems use Border Gateway Protocols (BGPs) to exchange routing information, the entry and exit routers within a data network are equivalent to knowing the BGP next hop routers for the source and destination network prefixes, respectively. Therefore, one can look up the entry and exit routers from the BGP routing table using the source and destination network prefixes, respectively.

However, depending on the routing architecture for a particular data network, not all network prefixes may be in the BGP routing table, and therefore, it may not be possible to determine the entry and/or exit routers using only the BGP routing table.

Therefore, there exists a need for a system and method that facilitate the analysis of a communications network by allowing for identification of the entry and exit routers for traffic flowing through a data network.

SUMMARY OF THE INVENTION

Systems and methods consistent with the present invention address this need by providing a mechanism by which a network designer can analyze a data network.

In accordance with the purpose of the invention as embodied and broadly described herein, a method includes accessing a static routing table and/or an OSPF route summarization table for identifying the entry and exit routers for source and destination network prefixes, respectively. Being able to identify the entry and exit routers for a traffic flow greatly improves the network designer's ability analyze and model the data network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a process that improves analysis and modeling of a data network. The information provided by, for example, Cisco's NetFlow software by itself is not sufficient for traffic analysis and network modeling. For the information to be useful, one needs to know the autonomous system path a particular traffic flow takes to get from the source network to the destination network, and the entry and exit routers within the data network. In implementations consistent with the present invention, this information may be obtained based on the source and destination network prefixes of a traffic flow using the BGP routing table, external BGP peering table, static routing table, OSPF route summarization table, and network topology table.

The BGP routing table is obtained by downloading the output of the command "show ip bgp" from a router where the Netflow data was collected. In other words, the BGP routing table is specific to the router where the Netflow data was collected. The external BGP peering table, static routing table, OSPF route summarization table, and network topology table can be extracted and generated from the router configuration files of all the routers in the data network. In other words, these tables are not specific to the router where the Netflow data was collected, instead, the tables are specific to the data network where the router resides.

Exemplary Network

Within the context of this documentation, the words data network, routing domain, and autonomous system are used interchangeably.

Figure 1:
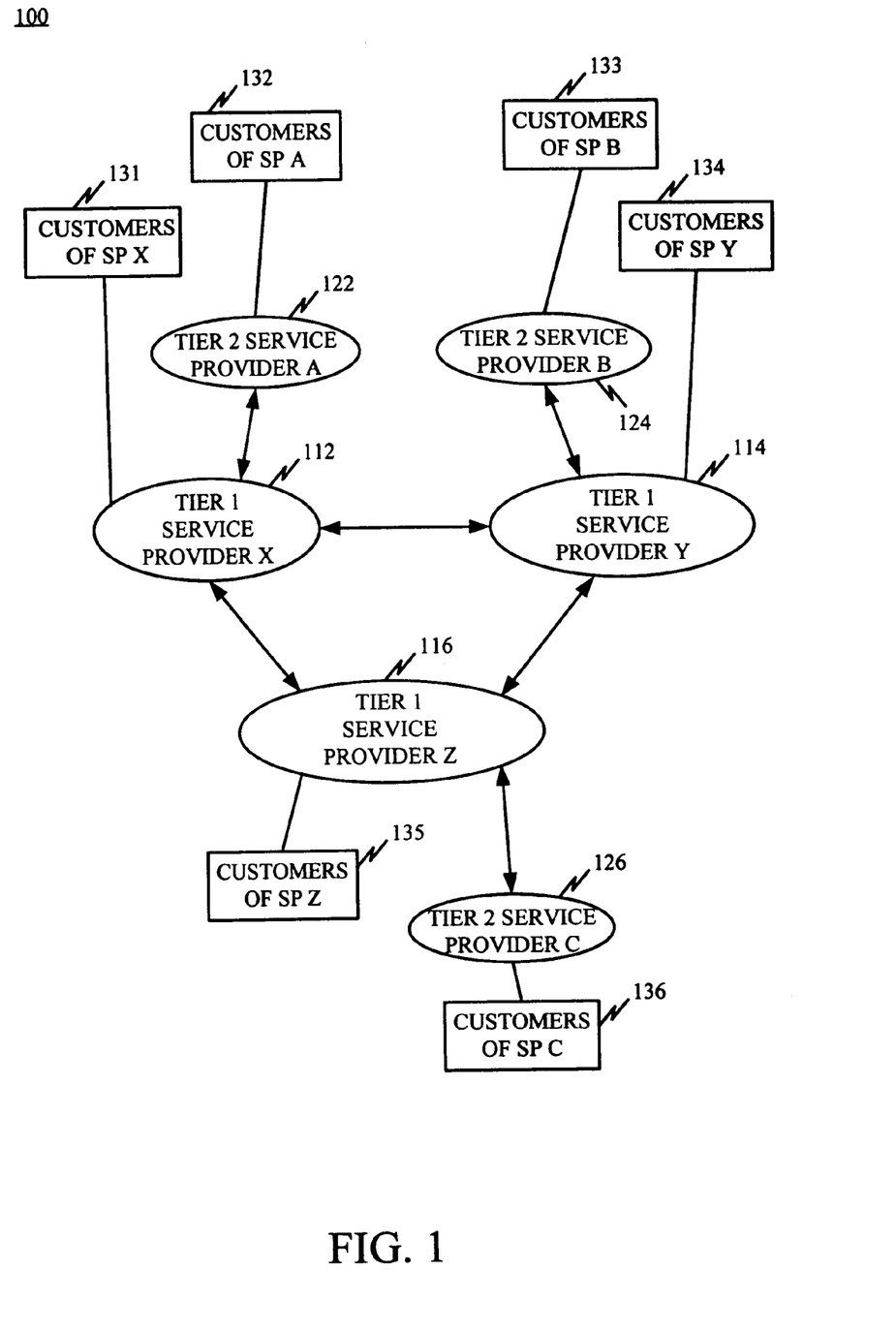
FIG. 1 illustrates an Internet in which a system and method, consistent with the present invention, may be implemented.

FIG. 1 illustrates an exemplary Internet (or other similar type of network) 100 in which a system and method, consistent with the present invention, that improve analysis and modeling of a data network, such as tier one service provider (or data network) 112, may be implemented. In FIG. 1, Internet 100 includes several tier one Internet service providers (ISPs) 112–116, tier two Internet service providers 122–126, and customers 131–136. Each ISP, whether it is a tier one ISP or a tier two ISP, has its own autonomous system number. Customers of the ISPs may or may not have their own autonomous system numbers. If the customers do not have their own autonomous system numbers, they are said to be part of the autonomous system of their associated ISP.

The tier one ISPs 112–116 are large national ISPs. All the tier one ISPs exchange traffic with each other directly. This is known as peering. Every tier one ISP peers with every other tier one ISP.

The tier two ISPs 122–126 are regional ISPs or smaller ISPs that rely on a tier one ISP to provide transit service. The tier two ISPs are generally connected to one or more tier one ISP.

Each routing domain functions independently from the other routing domains, but they may choose to cooperate with each other to deliver data. Different routing domains cooperate with each other by exchanging routing information using external gateway protocols such as the Border Gateway Protocol (BGP). Within each routing domain, internal gateway protocols are used such as the Open Shortest Path First (OSPF) protocol.

Data originating from a source network may need to go through multiple autonomous systems before arriving at the destination network. For example, traffic originated from customer 132 and destined to customer 133 may go through ISP 122, ISP 112, ISP 114, and ISP 124. In other words, traffic passing through a data network, ISP 112 for example, may come from a source network multiple autonomous systems away and may end up in a destination network several autonomous systems away.

Implementations consistent with the present invention provide a method by which the entry and exit routers of a particular data network (e.g., data network 112) for a traffic flow (traffic flows are characterized by the source and destination network prefixes) may be identified whether the traffic flow originates from a source network multiple autonomous systems away and terminates in a destination network several autonomous systems away.

Exemplary Router Configuration

Figure 2:
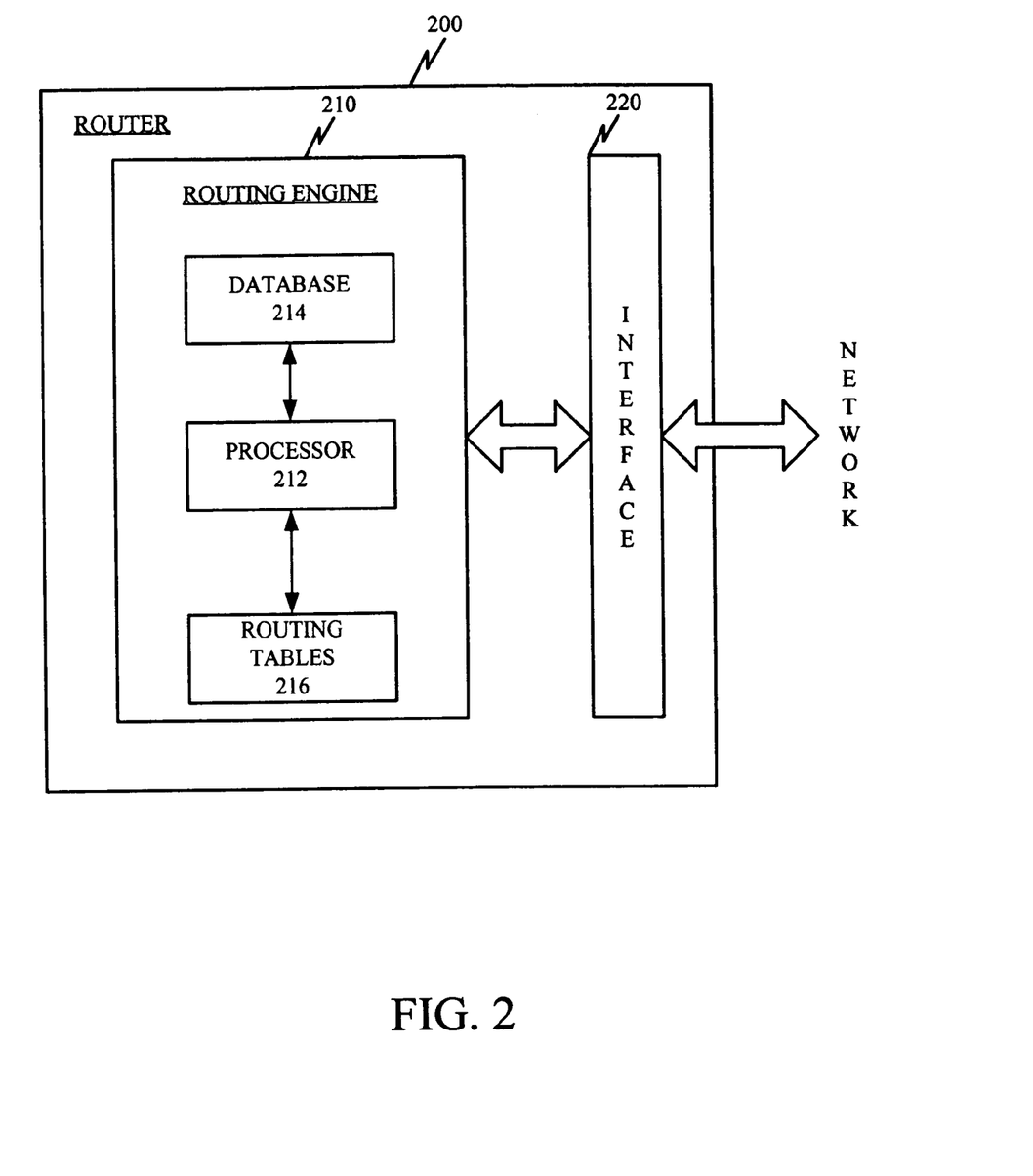
FIG. 2 illustrates an exemplary router configuration consistent with the present invention.

FIG. 2 illustrates an exemplary router 200 consistent with the present invention. The router 200 includes a routing engine 210, having a processor 212, a database 214, and one or more routing tables 216, and an interface 220.

The processor 212 may be any type of conventional processing device. The processor 212 determines the path on which a received packet is to be routed through a network, such as network 100, toward its ultimate destination based on information contained in the database 214 and routing tables 216.

The database 214 may include any type of conventional storage device. The database 214 stores information that aids in the routing of packets and the identification of alternate paths. Database 214 may include one or more conventional databases, such as a Link State Database, a PATHS Database, and a Forwarding Database.

The routing tables 216 may include any type of conventional storage device. A routing table 216, consistent with the present invention, may include a BGP routing table and a static routing table.

The interface 220 may include any type of conventional interface that provides a physical connection between the routing engine 210 and the network 100. A single interface 220 is illustrated for clarity. A particular router 200 may, in practice, include multiple interfaces 220 coupled to multiple networks. Moreover, a particular router 200 may include additional devices (not shown) that aid in the receiving, transmitting, and processing of information received at the router.

Exemplary Routing Tables

Figure 3:
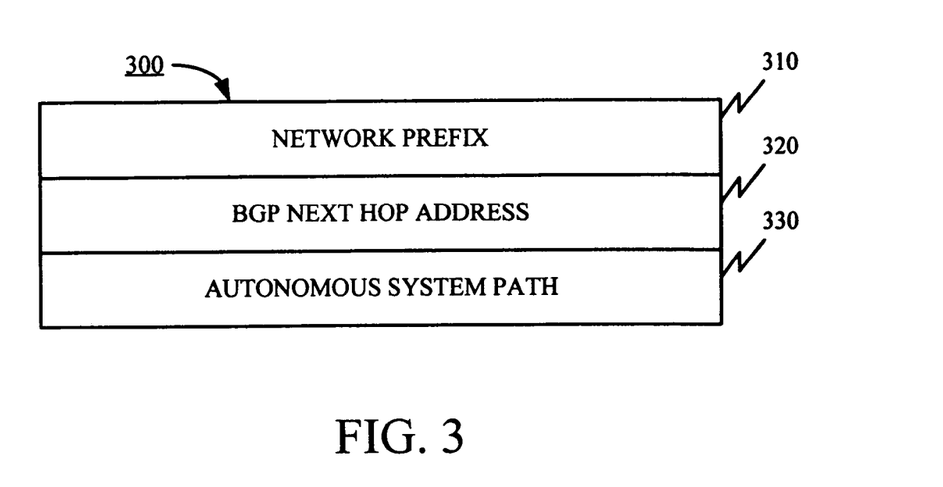
FIG. 3 illustrates an exemplary BGP routing table consistent with the present invention.

FIGS. 3–7 illustrate exemplary tables, consistent with the present invention, that may be used in network analysis and modeling. FIG. 3 illustrates an exemplary BGP routing table 300 consistent with the present invention. The BGP routing table 300 contains the best BGP route for each of the network prefixes learned via BGP.

The BGP routing table 300 includes a network prefix field 310, a BGP next hop's address field 320, and an autonomous system path field 330. The network prefix field 310 stores a network prefix. The BGP next hop's address field 320 stores the address of the router that advertises the prefix in the network prefix field 310. The autonomous system (AS) path field 330 stores a sequence of autonomous systems that a particular data packet needs to traverse in order to reach its final destination network. For example, a sequence may be represented by 701 7260 10656, where each group of numbers (e.g., 701) identifies an autonomous system. In order to reach the destination network, therefore, the packet needs to travel through Autonomous System 701, then through Autonomous System 7260, and finally through Autonomous System 10656. Table 1 illustrates an exemplary entry of a BGP routing table 300.

TABLE 1

| Network Prefix | BGP Next Hop | AS Path |
| --- | --- | --- |
| 12.2.97.0/24 | 137.39.23.89 | 701 7260 10656 |

Figure 4:
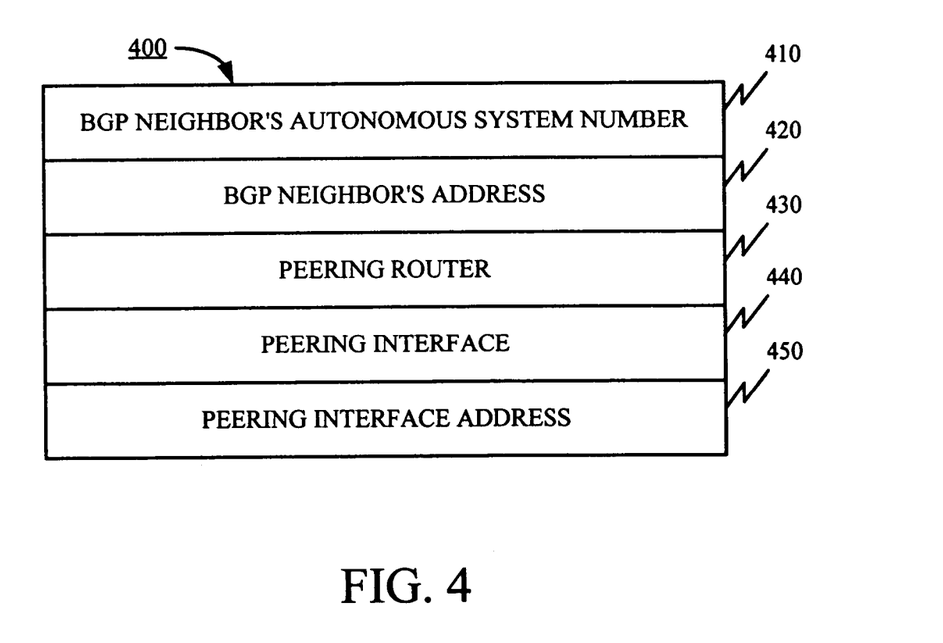
FIG. 4 illustrates an exemplary external BGP peering table consistent with the present invention.

FIG. 4 illustrates an exemplary external BGP peering table 400 consistent with the present invention. The external BGP peering table 400 contains peering information for each of the external BGP neighbors. The external BGP peering table 400 includes an external BGP neighbor's autonomous system number field 410, an external BGP neighbor's address field 420, a peering router field 430, a peering interface field 440, and a peering interface address field 450.

The external BGP neighbor's autonomous system number field 410 stores the autonomous system number to which the external BGP neighbor belongs. The external BGP neighbor's address field 420 stores the address of the external BGP neighbor. The peering router field 430 stores the identity of the router, in our autonomous system, that exchanges external BGP routing information with the external BGP neighbor. The peering interface field 440 stores the identity of the interface of the peering router in the peering router field 430 that the peering router uses to reach the external BGP neighbor. The peering interface address field 450 stores the address of the peering interface identified in the peering interface field 440. Table 2 illustrates an exemplary entry in a BGP peering table 400.

TABLE 2

| External BGP Neighbor's AS Number | External BGP Neighbor's Address | Peering Router | Peering Interface | Peering Interface Address |
| --- | --- | --- | --- | --- |
| 701 | 137.39.23.89 | boston1-br2 | POS8/0/0 | 137.39.23.90 |

Figure 5:
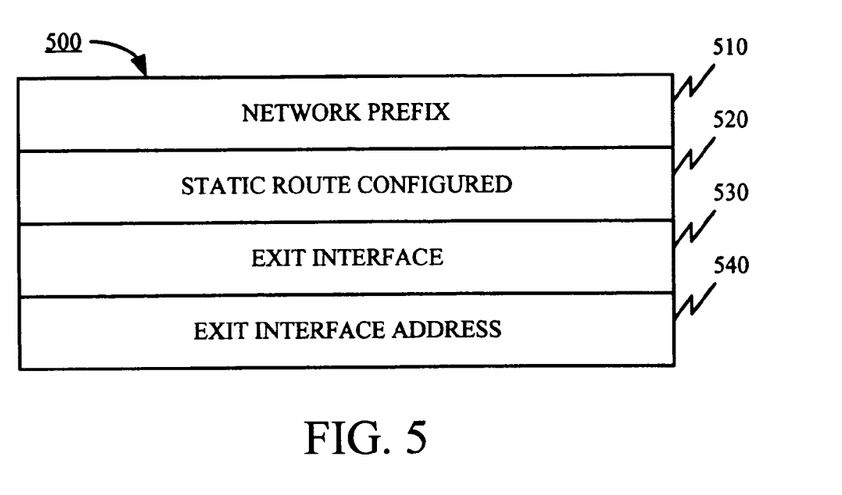
FIG. 5 illustrates an exemplary static routing table consistent with the present invention.

FIG. 5 illustrates an exemplary static routing table 500 consistent with the present invention. The static routing table 500 contains information related to where and how the static routes are configured in the data network. The static routing table 500 includes a network prefix field 510, a static route configured field 520, an exit interface field 530, and an exit interface address field 540.

The network prefix field 510 stores a network prefix. The static route configured field 520 stores the identity of the router where the static route for the network prefix identified in the network prefix field 510 is configured. The exit interface field 530 stores the identity of the interface of the configured router identified in the static route configured field 520 that the configured router uses to send data for the network prefix specified in the network prefix field 510. The exit interface address field 540 stores the address of the exit interface identified in field 530. Table 3 illustrates an exemplary entry of a static routing table 500.

TABLE 3

| Network Prefix | Static Route Configured | Exit Interface | Exit Interface Address |
|---|---|---|---|
| 4.21.227.0/24 | atlanta1-cr1 | hssi3/0 | 4.0.128.245 |

Figure 6:
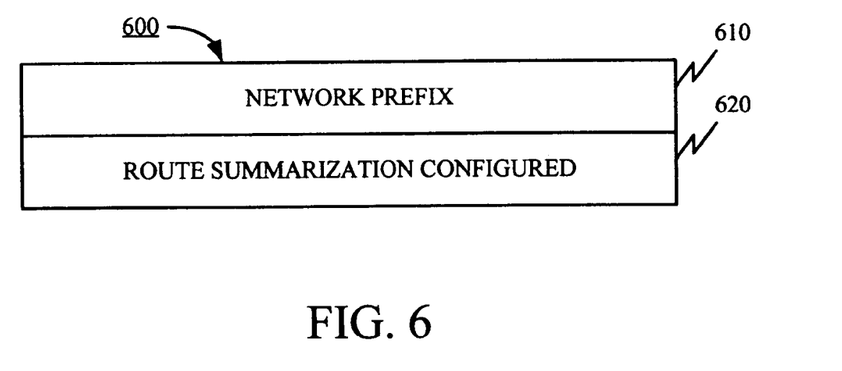
FIG. 6 illustrates an exemplary open shortest path first (OSPF) route summarization table consistent with the present invention.

FIG. 6 illustrates an exemplary OSPF route summarization table 600 consistent with the present invention. The OSPF route summarization table 600 contains information related to where and how the OSPF route summarizations are configured within the data network. The OSPF route summarization table 600 includes a network prefix field 610 and a route summarization configured field 620.

The network prefix field 610 stores a network prefix. The route summarization configured field 620 stores the identity of the router where the OSPF route summarization is configured for the network prefix identified in the network prefix field 610. Table 4 illustrates an exemplary entry in an OSPF route summarization table 600.

TABLE 4

| Network Prefix | Route Summarization Configured |
|---|---|
| 207.240.16.0/21 | laxcolo-border1 |

Figure 7:
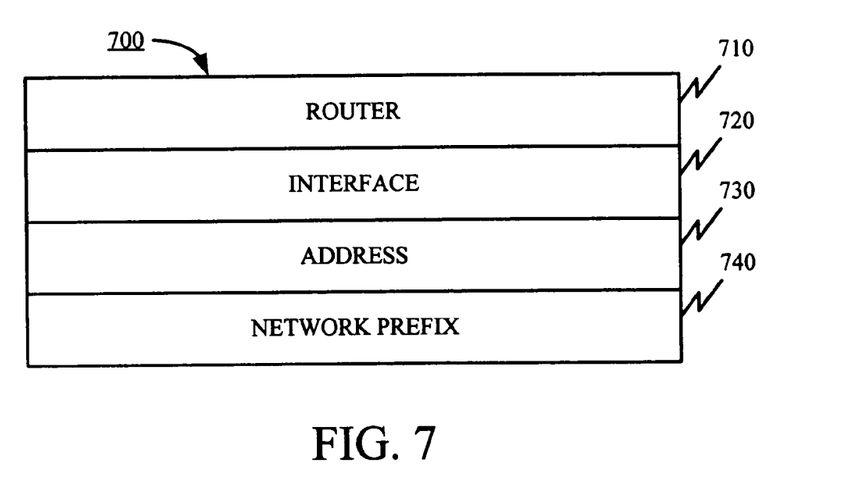
FIG. 7 illustrates an exemplary network topology table consistent with the present invention.

FIG. 7 illustrates an exemplary network topology table 700 consistent with the present invention. The network topology table 700 contains information for every interface of every router within the data network. The network topology table 700 includes a router field 710, an interface field 720, an address field 730, and a network prefix field 740.

The router field 710 stores the identity of a router in the data network. The interface field 720 stores the identity of an interface of the router identified in the router field 710. The address field 730 stores the address of the interface identified in the interface field 720. The network prefix field 740 stores the network prefix of the network to which the interface in the interface field 720 is connected. Table 5 illustrates an exemplary entry of a network topology table 700.

TABLE 5

| Router | Interface | Address | Network Prefix |
|---|---|---|---|
| atlanta1-cr1 | hssi3/0 | 4.0.128.245 | 4.0.128.244/30 |

Exemplary System

Figure 8:
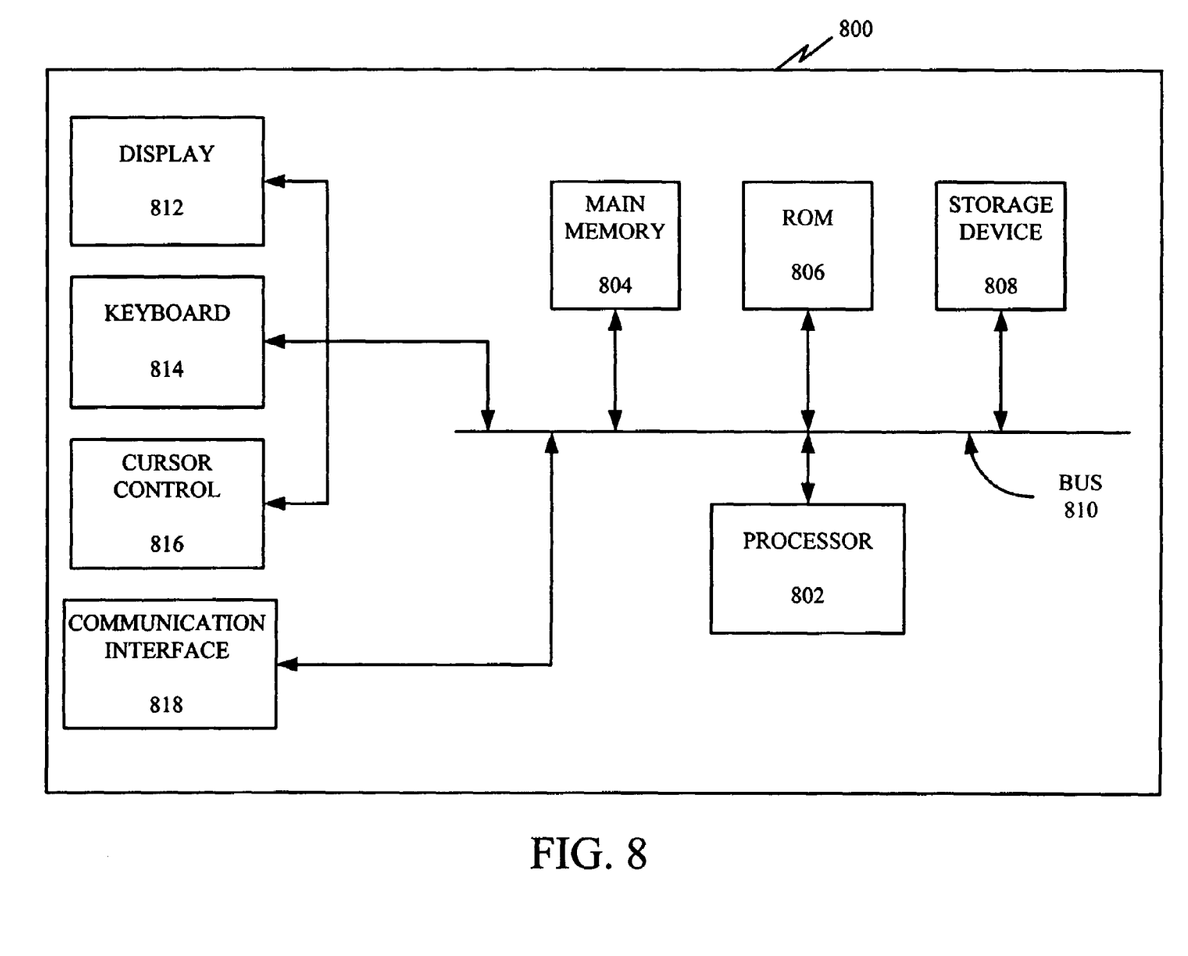
FIG. 8 illustrates an exemplary system upon which a system and method, consistent with the present invention, may be implemented.

FIG. 8 illustrates an exemplary system upon which a system and method, consistent with the present invention, may be implemented. In FIG. 8, the exemplary system 800 includes a processor 802, a main memory 804, a read only memory (ROM) 806, a storage device 808, a bus 810, a display 812, a keyboard 814, a cursor control 816, and a communication interface 818.

The processor 802 may be any type of conventional processing device that interprets and executes instructions. Main memory 804 may be a random access memory (RAM) or a similar dynamic storage device. Main memory 804 stores information and instructions for executing by processor 802. Main memory 804 may also store temporary variables or other intermediate information used during execution of instructions by processor 802. ROM 806 stores static information and instructions for processor 802. ROM 806 may be replaced with some other type of static storage device. The storage device 808 may include any type of magnetic or optical disk and its corresponding disk drive. Storage device 808 may store information and instructions for use by processor 802. Bus 810 includes a set of hardware lines (conductors) that allows for data transfer among the components of the system 800.

The display device 812 may be a cathode ray tube (CRT), or the like, for displaying information to an operator. The keyboard 814 and cursor control 816 allow the operator to interact with the system 800. The cursor control 816 may include, for example, a mouse, a pen, voice recognition and/or biometric mechanisms, and the like.

Communication interface 818 enables the system to communicate with other devices/systems via any communications medium. For example, communication interface 818 may be a modem or an Ethernet interface to a local area network (LAN). Alternatively, communication interface 818 may be any other interface that enables communication between the system 800 and other devices or systems.

The system 800 performs the functions necessary to model and analyze a network in response to processor 802 executing sequences of instructions contained in, for example, memory 804. Such instructions may be read into memory 804 from another computer-readable medium, such as data storage device 808, or from another device via communication interface 818. Execution of the sequences of instructions contained in memory 804 causes processor 802 to perform a method that will be described hereafter. Alternatively, hardwired circuitry may be used in place of or in combination with software instructions to implement the present invention. Thus, the present invention is not limited to any specific combination of hardware circuitry and software.

Exemplary Process

Figure 9A:
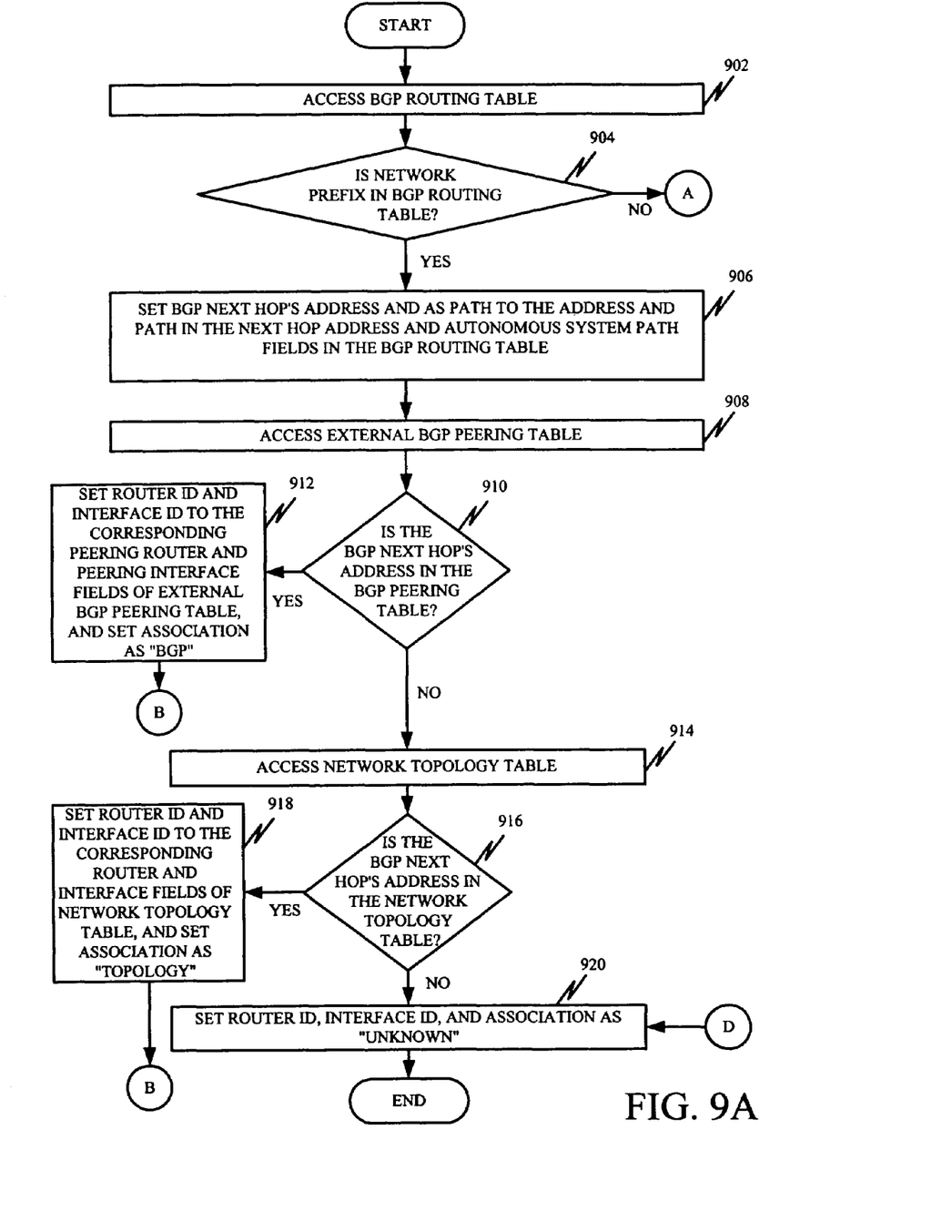
FIGS. 9A–9C illustrate an exemplary process, consistent with the present invention, that improves network analysis and modeling.
Figure 9B:
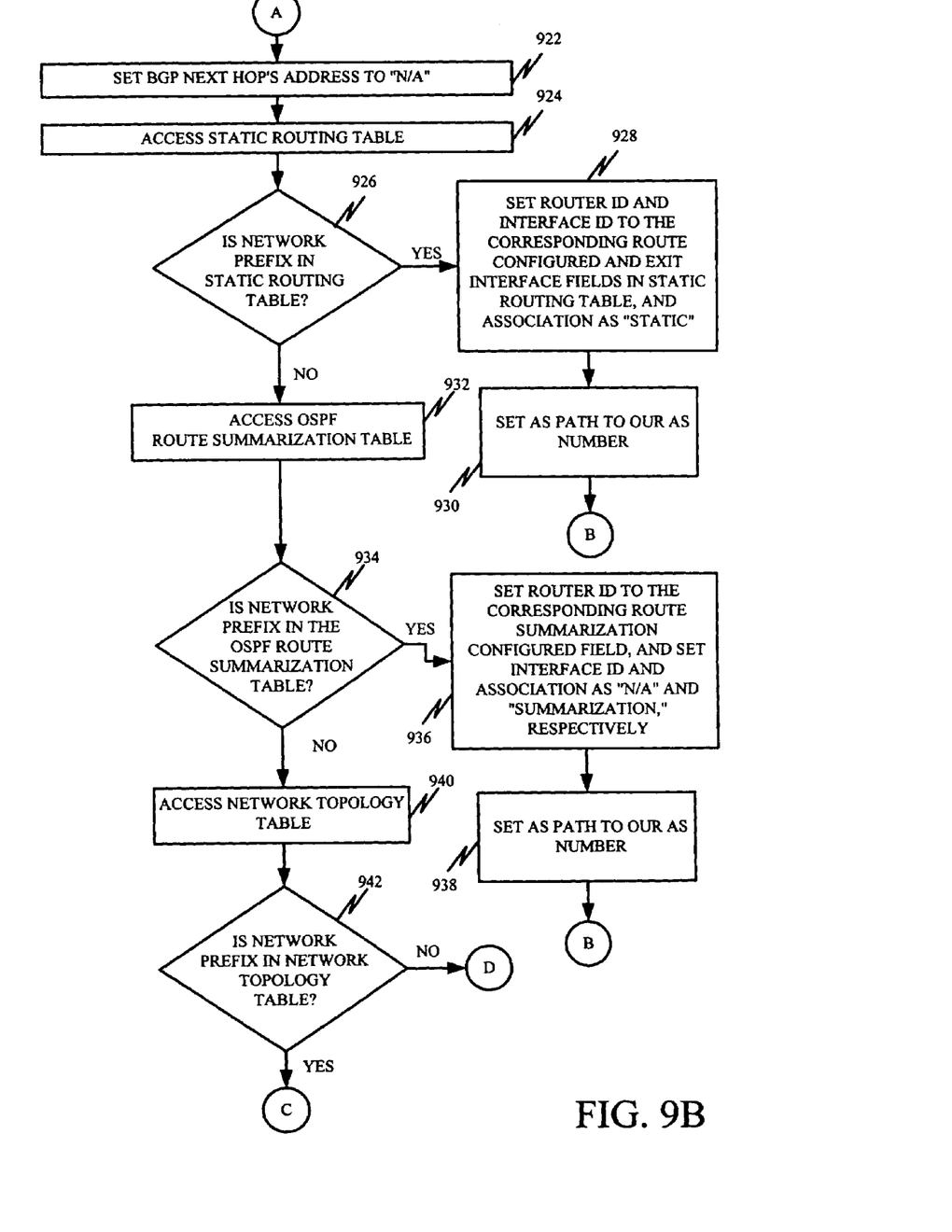
Figure 9C:
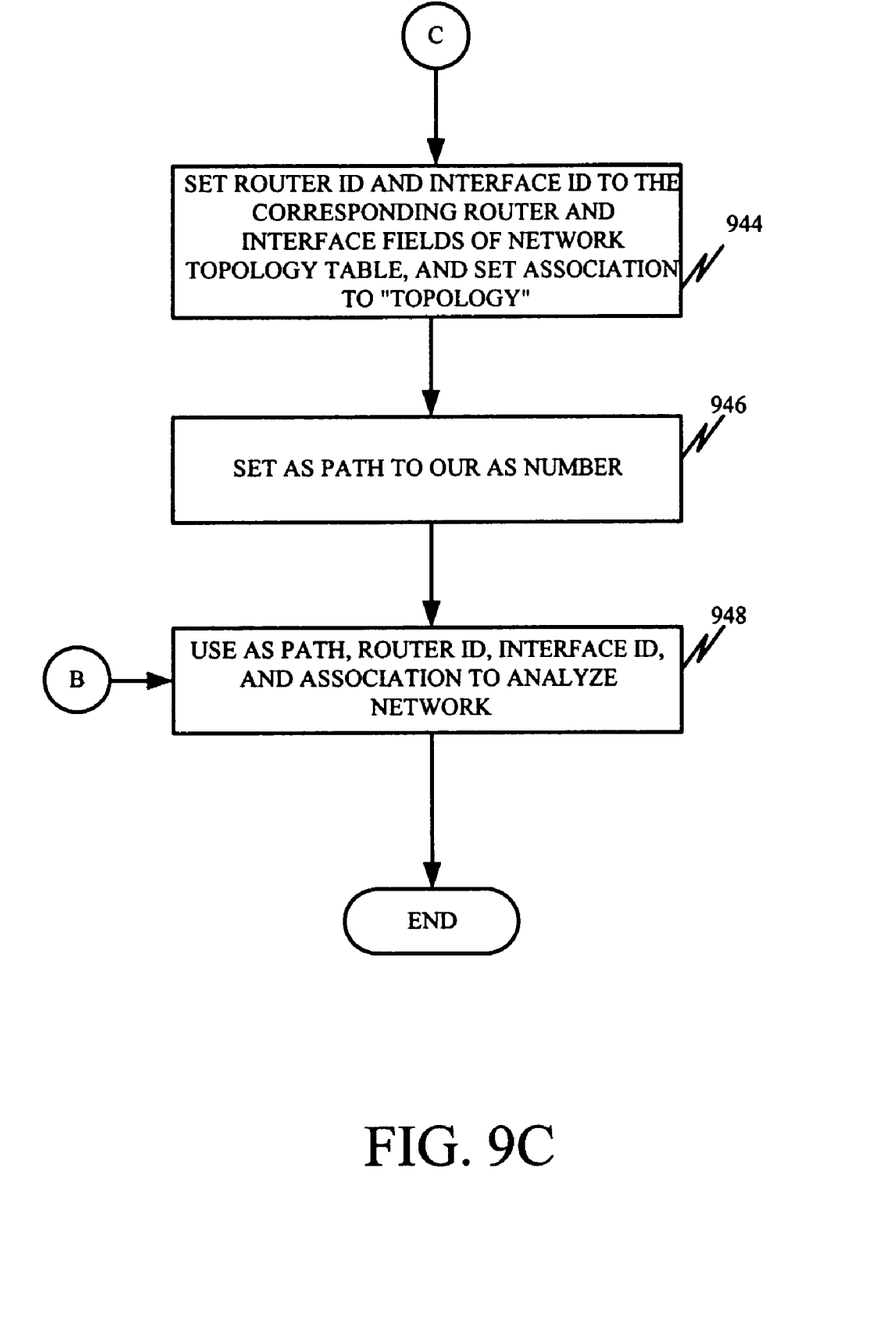

FIGS. 9A–9C illustrate an exemplary process, consistent with the present invention, that improves network modeling and analysis. The system 800 determines the identity of the entry and exit routers in an autonomous system using the source and destination network prefixes, the BGP routing table, the external BGP peering table, the static routing table, the OSPF route summarization table, and the network topology table.

To determine the BGP next hop's address and the autonomous system path for a network prefix, the system 800 accesses the BGP routing table 300 [step 902]. The system 800 determines whether the network prefix is in the network prefix field 310 of the BGP routing table 300 [step 904]. If the network prefix is in the network prefix field 310, the system 800 sets the BGP next hop's address to the corresponding address in the BGP next hop address field 320 of the BGP routing table 300. The system 800 also sets the autonomous system (AS) path to the corresponding autonomous system path in the autonomous system path field 330 of the BGP routing table 300 [step 906].

The system 800 then accesses the external BGP peering table 400 [step 908]. To determine the identity of the BGP next hop's address (i.e., router identity, interface identity, and association), the system 800 determines whether the BGP next hop's address is in the BGP neighbor's address field 420 of the external BGP peering table 400 [step 910]. If the address is in the BGP neighbor's address field 420, the system 800 sets the router identity to the corresponding identity in the peering router field 430, sets the interface identity to the corresponding identity in the peering interface field 440, and sets the association as "BGP" to signify that the identity is determined by the external BGP peering table 400 [step 912].

If the BGP next hop's address is not in the BGP peering table 400, the system 800 accesses the network topology table 700 [step 914]. The system 800 determines whether the BGP next hop's address is in the address field 730 in the network topology table 700 [step 916]. If the BGP next hop's address is in the address field 730, the system 800 sets the router identity to the corresponding identity in the router field 710, sets the interface identity to the corresponding identity in the interface field 720, and sets the association as "TOPOLOGY" to signify that the identity is determined by the network topology table 700 [step 918].

If the BGP next hop's address is not in the network topology table 700, the system 800 sets the router identity, the interface identity, and the association as "UNKNOWN" [step 920].

If, in step 904, the system 800 determines that the network prefix is not in the network prefix field 310 of the BGP routing table 300, the system 800 sets the BGP next hop's address as "not applicable" to indicate that the network prefix is not in the BGP routing table 300 [step 922—FIG. 9B]. The system 800 then accesses the static routing table 500 [step 924]. The system 800 determines whether the identity (i.e., router identity, interface identity, and association) of the network prefix is in the static routing table 500 [step 926]. If network prefix is in the network prefix field 510 of the static routing table 500, the system 800 sets the router identity to the corresponding identity in the static route configured field 520, sets the interface to the corresponding identity in the exit interface field 530, and sets the association as "STATIC" to signify that the identity is determined by the static routing table [step 928]. The system 800 also sets the autonomous system path to the autonomous system number of our autonomous system (i.e., the autonomous system being analyzed, such as autonomous system 112 in FIG. 1) [step 930].

If the network prefix is not in the static routing table 500, the system 800 accesses the OSPF route summarization table 600 [step 932]. The system 800 determines whether the network prefix is in network prefix field 610 of the OSPF route summarization table 600 [step 934]. If network prefix is in the network prefix field 610, the system 800 sets the router identity to the corresponding identity in the route summarization configured field 620, sets the interface identity to "not applicable," and sets the association as "SUMMARIZATION" to signify that the identity is determined by the OSPF route summarization table 600 [step 936]. The system 800 also sets the autonomous system path to the autonomous system number of our autonomous system [step 938].

If the network prefix is not in the OSPF route summarization table 600, the system 800 accesses the network topology table 700 [step 940]. The system 800 determines whether the network prefix is in the network prefix field 740 of the network topology table 700 [step 942]. If the network prefix is in the network prefix field 740, the system 800 sets the router identity to the corresponding identity in the router field 710, sets the interface identity to the corresponding identity in the interface field 720, and sets the association as "TOPOLOGY" to indicate that the identity is determined by the network topology table 700 [step 944—FIG. 9C]. The system 800 also sets the autonomous system path to the autonomous system number of our autonomous system [step 946].

If the network prefix is not in the static routing table 500, the OSPF route summarization table 600, or the network topology table 700, the system 800 sets the router identity, interface identity, and association as "UNKNOWN" [step 920].

Once the identity of the network prefix has been determined, the system 800 analyzes the network using the determined identity [step 948]. The system 800 may, for example, use the identity for traffic analysis or modeling of the network.

It is evident that from a network prefix, whether it is a source or destination prefix, the system 800 is capable of determining the BGP next hop's address, router identity, interface identity, association, and autonomous system path associated with the network prefix. The router identities associated with the source and destination network prefixes are the entry and exit routers, respectively, in our autonomous system (i.e., the autonomous system being analyzed) for that particular traffic flow. The autonomous system paths associated with the source and destination network prefixes are the sequences of autonomous systems from the source network to the destination network. This information facilitates network analysis and modeling.

CONCLUSION

Systems and methods consistent with the present invention provide a mechanism that improves analysis of a data network. In implementations consistent with the present invention, a system extracts and generates static routing information and/or the Open Shortest Path First (OSPF) route summarization information from a router's configuration files to determine the entry and exit routers within a data network for the source and destination network prefixes, respectively, of a traffic flow. This information can then be used to analyze and model the network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been presented with respect to FIGS. 9A to 9C, the order of the steps does not matter.

The scope of the invention is defined by the following claims and their equivalents.

What is claimed is:

1. A method for analyzing a data network having a plurality of routers comprising:

accessing at least one of a static routing table and a route summarization table;

determining if a particular network prefix is included in the static routing table or the route summarization table;

setting an identity of the network device to an identity in the static routing table or the route summarization table that corresponds to the network prefix if it is determined that the network prefix is included in the static routing table or the route summarization table;

determining an identity of the network device based on the network prefix corresponding to the set identity; and analyzing the data network using the determined identity.

2. The method of claim 1 wherein the determining includes:

determining router information, interface information, and association information for the network prefix.

3. The method of claim 1 wherein the analyzing includes: analyzing traffic of the data network.

4. The method of claim 1 wherein the analyzing includes: modeling the data network.

5. The method of claim 1 wherein the determining includes:

determining an identity of an exit or entry router in the data network.

6. A system for analyzing a data network having a plurality of routers, said system comprising:

means for accessing at least one of a static routing table and a route summarization table;

means for determining if a particular network prefix is included in the static routing table or the route summarization table;

means for setting an identity of the network device to an identity in the static routing table or the route summarization table that corresponds to the network prefix if it is determined that the network prefix is included in the static routing table or the route summarization table;

means for determining an identity of the network device based on the network prefix corresponding to the set identity; and means for analyzing the data network using the determined identity.

7. A system for analyzing a data network, said system comprising:

a memory configured to store information representing a static routing table and a route summarization table; and a processor configured to:

access at least one of the static routing table and the route summarization table;

determine if a particular network prefix is included in the static routing table or the route summarization table;

set an identity of the network device to an identity in the static routing table or the route summarization table that corresponds to the network prefix if it is determined that the network prefix is included in the static routing table or the route summarization table;

determine an identity of the network device based on the network prefix corresponding to the set identity; and analyze the data network using the determined identity.

8. The system of claim 7 wherein, when determining, the processor is configured to:

determine router information, interface information, and association information for the network prefix.

9. The system of claim 7 wherein, when analyzing, the processor is configured to:

analyze traffic of the data network using the determined identity.

10. The system of claim 7 wherein, when analyzing, the processor is configured to:

model the data network using the determined identity.

11. The system of claim 7 wherein, when determining, the processor is configured to:

determine an identity of an exit or entry router in the data network.

12. A computer-readable medium containing instructions for controlling at least one processor to perform a method that analyzes a data network having a plurality of routers, the method comprising:

accessing at least one of a static routing table and a route summarization table from a router;

determining if a particular network prefix is included in the static routing table or the route summarization table;

setting an identity of the network device to an identity in the static routing table or the route summarization table that corresponds to the network prefix if it is determined that the network prefix is included in the static routing table or the route summarization table;

determining an identity of the network device based on the network prefix corresponding to the set identity; and analyzing the data network using the determined identity.

13. The computer-readable medium of claim 12 wherein the determining includes:

determining router information, interface information, and association information for the network prefix.

14. The computer-readable medium of claim 12 wherein the analyzing includes:

analyzing traffic of the data network.

15. The computer-readable medium of claim 12 wherein the analyzing includes:

modeling the data network.

16. The computer-readable medium of claim 12 wherein the determining includes:

determining an identity of an exit or entry router in the data network.

17. A method for determining an identity of a network device, the network device being associated with a network prefix, the method comprising:

accessing one or more of a border gateway protocol peering table, a static route table, an open shortest path first route summarization table, and a network topology table;

determining whether one or more of the accessed tables contains the network prefix;

setting an identity of the network device to an identity in one or more of the accessed tables that corresponds to the network prefix if it is determined that the network prefix is included in one or more of the accessed tables; and determining the identity of the network device based on the network prefix corresponding to the set identity.

18. The method of claim 17 wherein the determining an identity includes:

determining router information, interface information, and association information.

19. A system for determining an identity of a network device, the network device being associated with a network prefix, the system comprising:

a memory configured to store one or more of a border gateway protocol peering table, a static route table, an open shortest path first route summarization table, and a network topology table; and     a processor configured to:

access, from the memory, one or more of the border gateway protocol peering table, the static route table, the open shortest path first route summarization table, and the network topology table;

determine whether one of the accessed tables contains the network prefix;

set an identity of the network device to an identity in one or more of the accessed tables that corresponds to the network prefix if it is determined that the network prefix is included in one or more of the accessed tables; and         determine the identity of the network device based on the network prefix corresponding to the set identity.

20. The system of claim 19 wherein, when determining an identity, the processor is configured to:

determine router information, interface information, and association information.

21. A computer-readable medium containing instructions for controlling at least one processor to perform a method that determines an identity of a network device, the network device being associated with a network prefix, the method comprising:

accessing, from a router, one or more of a border gateway protocol peering table, a static route table, an open shortest path first route summarization table, and a network topology table;

determining whether one of the accessed tables contains the network prefix;

setting an identity of the network device to an identity in one or more of the accessed tables that corresponds to the network prefix if it is determined that the network prefix is included in one or more of the accessed tables; and     determining the identity of the network device based on the network prefix corresponding to the set identity.

22. The computer-readable medium of claim 21 wherein the determining an identity includes:

determining router information, interface information, and association information.

* * * * *